US012402164B2

United States Patent
Niu et al.

(10) Patent No.: US 12,402,164 B2
(45) Date of Patent: Aug. 26, 2025

(54) TECHNIQUES OF BEAMFORMING IN REFERENCE SIGNAL (RS) TRANSMISSIONS

(71) Applicant: APPLE INC., Cupertino, CA (US)

(72) Inventors: Huaning Niu, Cupertino, CA (US);
Chunxuan Ye, San Diego, CA (US);
Dawei Zhang, Cupertino, CA (US);
Haitong Sun, Cupertino, CA (US);
Hong He, Cupertino, CA (US);
Oghenekome Oteri, San Diego, CA (US); Sigen Ye, Cupertino, CA (US);
Wei Zeng, Cupertino, CA (US);
Weidong Yang, San Diego, CA (US);
Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 966 days.

(21) Appl. No.: 17/593,538

(22) PCT Filed: Oct. 15, 2020

(86) PCT No.: PCT/CN2020/121212
§ 371 (c)(1),
(2) Date: Sep. 20, 2021

(87) PCT Pub. No.: WO2022/077356
PCT Pub. Date: Apr. 21, 2022

(65) Prior Publication Data
US 2022/0312477 A1     Sep. 29, 2022

(51) Int. Cl.
*H04W 74/0808*     (2024.01)
(52) U.S. Cl.
CPC .................. *H04W 74/0808* (2013.01)
(58) Field of Classification Search
None
See application file for complete search history.

(56) References Cited

U.S. PATENT DOCUMENTS

| 10,375,582 B2 | 8/2019 | Chandrasekhar et al. |
| 10,595,327 B2 | 3/2020 | Sadek et al. |

(Continued)

FOREIGN PATENT DOCUMENTS

| CN | 107113886 A | 8/2017 |
| CN | 108141883 A | 6/2018 |

(Continued)

OTHER PUBLICATIONS

Intel Corporation,"LBT design for LAA downlink", R1-151104, 3GPP TSG RAN WG1 Meeting Ad-hoc, Paris, France, Agenda Item 2.2, Mar. 24-26, 2015, 7 pages.

(Continued)

*Primary Examiner* — Mariela Vidal Carpio
(74) *Attorney, Agent, or Firm* — Dorsey & Whitney LLP

(57) ABSTRACT

Techniques of beamforming in reference signal (RS) transmissions, applicable to frequency ranges including frequencies between 52.6 GHz and 71 GHz, are described. Such techniques may include determining a communication channel is unoccupied for an initial duration, determining a number of communication slots of the communication channel to defer for transmission, and counting one or more communication slots of the communication channel that are not in use. The techniques may include determining the number of counted one or more communication slots is not equal to the determined number of communication slots of the communication channel to defer, and transmitting one or more data units based on the determination that the number of the counted one or more communication slots is not equal to the determined number of communication slots of the communication channel to defer.

18 Claims, 9 Drawing Sheets

(56) References Cited

U.S. PATENT DOCUMENTS

| | | | | |
|---|---|---|---|---|
| 12,047,155 | B2* | 7/2024 | Babaei | H04W 52/36 |
| 12,048,000 | B2* | 7/2024 | Nogami | H04W 74/08 |
| 2017/0019924 | A1* | 1/2017 | Wang | H04L 5/0092 |
| 2017/0171773 | A1* | 6/2017 | Cariou | H04W 74/0841 |
| 2017/0231006 | A1* | 8/2017 | Yin | H04W 72/0446 |
| 2018/0115981 | A1* | 4/2018 | Kim | H04W 72/1215 |
| 2018/0124611 | A1* | 5/2018 | Moon | H04W 72/0453 |
| 2018/0234965 | A1* | 8/2018 | Ahn | H04W 72/21 |
| 2018/0310340 | A1* | 10/2018 | Noh | H04L 27/2657 |
| 2018/0332478 | A1* | 11/2018 | Noh | H04L 27/26 |
| 2019/0394792 | A1* | 12/2019 | Jeon | H04W 72/1215 |
| 2020/0053728 | A1* | 2/2020 | Huang | H04L 27/26025 |
| 2021/0014694 | A1* | 1/2021 | Li | H04J 13/0062 |
| 2021/0058967 | A1* | 2/2021 | Oteri | H04W 72/23 |
| 2021/0092763 | A1* | 3/2021 | Li | H04W 72/569 |
| 2021/0185719 | A1* | 6/2021 | Xue | H04L 5/0092 |
| 2021/0266214 | A1* | 8/2021 | Sun | H04W 74/0808 |
| 2021/0385831 | A1* | 12/2021 | Nogami | H04L 5/0094 |
| 2021/0392685 | A1* | 12/2021 | Myung | H04W 72/1263 |
| 2022/0046722 | A1* | 2/2022 | Kim | H04L 5/0048 |
| 2022/0377683 | A1* | 11/2022 | Myung | H04W 74/0816 |
| 2023/0164841 | A1* | 5/2023 | Talarico | H04L 27/0006 370/329 |
| 2023/0199835 | A1* | 6/2023 | Toft | H04W 74/0808 370/329 |
| 2023/0300881 | A1* | 9/2023 | Myung | H04L 5/00 370/329 |

FOREIGN PATENT DOCUMENTS

| | | |
|---|---|---|
| CN | 108702779 A | 10/2018 |
| CN | 109076605 A | 12/2018 |
| WO | 2016072916 A1 | 5/2016 |
| WO | 2017024036 A1 | 2/2017 |
| WO | 2017142452 A1 | 8/2017 |
| WO | 2017196416 A1 | 11/2017 |
| WO | 2019160741 A1 | 8/2019 |

OTHER PUBLICATIONS

WIPO, International Search Report and Written Opinion, PCT/CN2020/121212, Jul. 15, 2021, 9 pages.

Samsung, "Discussion on Channel Access Mechanisms for LAA", R1-144739, 3GPP TSG RAN1 #79, San Francisco, California, Agenda Item 6.3.2.2, Nov. 17-21, 2014, 5 pages.

Moderator (QualcommIncorporated), "Email discussion on channel access mechanism for 52.6GHZ-71GHz band, version 2", R1-2007193, 3GPP TSG RAN WG1 Meeting #102-e, Agenda Item 8.2.2, Aug. 17-24, 2020, 33 pages.

* cited by examiner

TECHNIQUES OF BEAMFORMING IN REFERENCE SIGNAL (RS) TRANSMISSIONS

TECHNICAL FIELD

This application relates generally to wireless communication systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
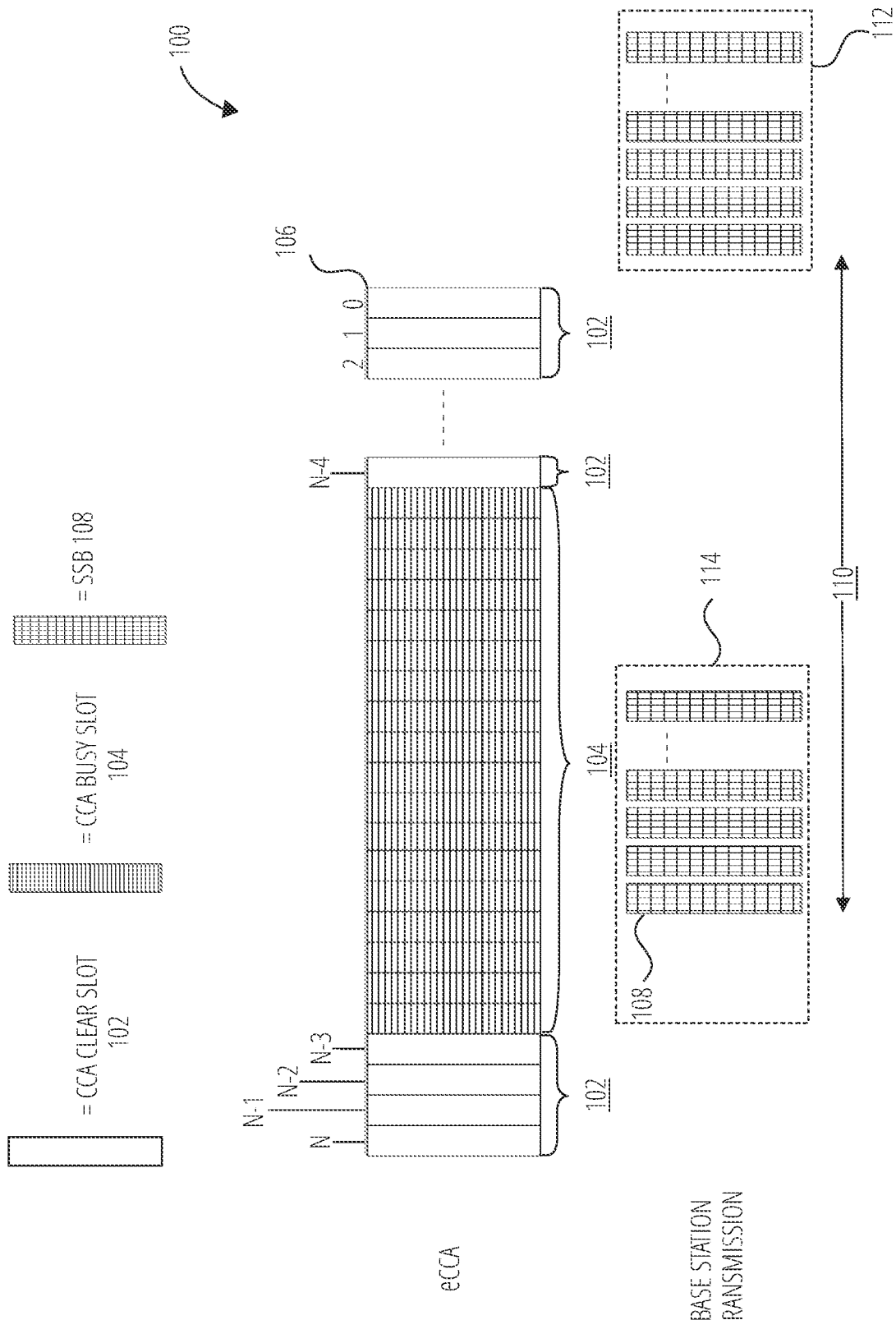
FIG. 1 illustrates operation of an extended clear channel assessment (eCCA) mechanism according to some embodiments.

Per Rel. 17 System Information (SI): New Radio (NR) 52.6-71 GHz, RP 193259/RP-200902 (December 2019), frequencies between 52.6 GHz and 71 GHz may be of interest due to proximity to sub-52.6 GHz frequencies (current NR system) and imminent commercial opportunities for high data rate communications, e.g., unlicensed spectrum between 57 GHz and 71 GHz. Studies have focused on the feasibility of using existing waveforms, and required changes for frequencies between 52.6 GHz and 71 GHz that are beneficial to take advantage these opportunities by, for example, minimizing specification burden and maximizing the leverage of Frequency Range 2 (FR2) based implementations. Previous SI on NR beyond 52.6 GHz up to 114.25 GHz (Completed 2019) are in Technical Report (TR) 38.807.

RP 193259/RP-200902 objectives included studying required changes to NR using existing downlink (DL)/uplink (UL) NR waveform to support operation between 52.6 GHz and 71 GHz, and applicable numerology including subcarrier spacing, channel bandwidth (BW) (including maximum BW), and their impact to FR2 physical layer design to support system functionality considering practical RF impairments (RAN1, RAN4). Objectives further included identifying potential critical problems to physical signal/channels, if any (e.g., RAN1). Objectives further included studying channel access mechanisms assuming beam based operation to comply with the regulatory requirements applicable to unlicensed spectrum for frequencies between 52.6 GHz and 71 GHz (e.g., RAN1). For potential interference, if interference is identified, interference mitigation solutions may be required as part of the channel access mechanism.

For channel access, in the RAN1 102-e Agreement, for gNB/UE to initiate a channel occupancy, both channel access with listen before talk (LBT) mechanism(s) and a channel access mechanism without LBT are supported. Items for further study (FFS) included (1) LBT mechanisms such as Omni-directional LBT, directional LBT and receiver assisted LBT type of schemes when channel access with LBT is used; (2) If operation restrictions for channel access without LBT are needed, e.g. compliance with regulations, and/or in presence of automatic transmit power control (ATPC), dynamic frequency selection (DFS), long term sensing, or other interference mitigation mechanisms; and (3) The mechanism and condition(s) to switch between channel access with LBT and channel access without LBT (if local regulation allows). The LBT procedures in draft v2.1.20 of EN 302 567 were agreed to be used as the baseline system evaluation with LBT. Enhancements to energy detection (ED) threshold, contention window sizes, etc. can be considered as part of the evaluations For the LBT requirement in ETSI EN 302.567 v2.1.20, a difference to the 5 GHz unlicensed band includes that extended clear channel assessment (eCCA) is used and there is no exponential backoff as in CAT4 LBT. There is also no access priority.

In ETSI EN 302.567 v2.1.20, the 4.2.5.3 requirement states that adaptivity (medium access protocol) shall be implemented by the equipment and shall be active under all circumstances and LBT is mandatory to facilitate spectrum sharing. The LBT mechanism is as follows:

1. Before a single transmission or a burst of transmissions on an Operating Channel, the equipment that initiates transmission shall perform a Clear Channel Assessment (CCA) Check in the Operating Channel.

2. If the equipment finds an Operating Channel is occupied, it shall not transmit in that channel and it shall not enable other equipment(s) to transmit in that channel. If the CCA check has determined the channel to be no longer occupied and transmission was deferred for the number of empty slots defined by the CCA Check procedure, it may resume transmissions or enable other equipment to transmit on this channel.

3. The equipment that initiates transmission shall perform the CCA check using "energy detect". The Operating Channel shall be considered occupied for a slot time of 5 μs if the energy level in the channel exceeds the threshold corresponding to the power level given in step 7) below. It shall observe the Operating Channel(s) for the duration of the CCA observation time measured by multiple slot times.

4. CCA Check definition:
   a) A CCA check is initiated at the end of an operating channel occupied slot time.
   b) Upon observing that Operating Channel was not occupied for a minimum of 8 μs, transmission deferring shall occur.
   c) The transmission deferring shall last for a minimum of random (0 to Max number) number of empty slots periods.
   d) Max number shall not be lower than 3.

5. The total time that the equipment initiating transmission makes use of an Operating Channel is defined as the Channel Occupancy Time (COT). This Channel Occupancy Time shall be less than 5 ms, after which the equipment shall perform a new CCA Check as described in step 1), step 2), and step 3) above.

6. An equipment (initiating or not initiating transmission), upon correct reception of a packet which was intended for this equipment, can skip the CCA Check, and immediately proceed with the transmission in response to received frames. A consecutive sequence of transmissions by the equipment, without a new CCA Check, shall not exceed the 5 ms Channel Occupancy Time as defined in step 5) above.

7. The energy detection threshold for the CCA Check shall be −47 dBm+10×log 10 (PMax/Pout) (Pmax and Pout in W (Effective Radiated Power (EIRP))) where Pout is the RF output power (EIRP) and Pmax is the RF output power limit defined in clause 4.2.2.1 of ETSI EN 302.567 v2.1.20.

In ETSI EN 302.567 v2.1.20, adaptivity testing procedure, 5.3.8 defines the test for adaptivity (medium access protocol). In steps 1 through 3, set up, configuration and interference addition are performed. In step 4, verification of reaction to the interference signal is performed, where beamforming short control signaling is allowed up to 10% of time. In particular, an analyzer monitors the transmissions of the unit under test (UUT) and the companion device on the selected operating channel after the interference signal was injected. This may require the analyzer sweep to be triggered by the start of the interfering signal. Using the procedure defined in clause 5.3.8.3, it is verified that:

a) The UUT stops transmissions on the current operating channel within a period equal to the maximum Channel Occupancy Time defined in clause 4.2.5.3; the UUT is allowed to respond to transmissions of the companion device and the channel occupancy time shall be less than or equal to the maximum channel occupancy time on the current operating channel.

b) Apart from transmission of the frames for short control signaling (such as, for example, ACK/NACK signals, beacon frames, other time synchronization frames and frames for beamforming) no frame shall be initiated.

c) The time synchronization and beam forming frames transmissions shall be less than or equal to 10% within an observation period of 100 milliseconds (ms).

d) On removal of the interference signal the UUT may start transmissions again on this channel. However, this is not a requirement and, therefore, does not require testing.

In discovery reference signal (DRS) transmission in Licensed Assisted Access (LAA)/NR-U, less than 6 GHz unlicensed band use priority based CCA can be used. In order to ensure DRS has higher chance of transmission, category 2 (CAT-2) or category 4 (CAT-4) with priority 1 is allowed. When DRS is less than 1 ms and DRS periodicity is less than or equal to 50 ms, one shot 25 micro seconds (μs) LBT (CAT-2) can be used. When DRS is less than or equal to 2 ms, priority 1 CAT-4 can be used. A large DRS window is configured when initial CCA is not successful because there may be large power consumption for UE to monitor.

In greater than 52.7 GHz band, a much larger number of beams are expected compared to NR-U. Thus, even larger transmission may be needed to accommodate beam training in different beam direction. For channel state information reference signal (CSI-RS) based beamforming, a UE may need to perform blind detection of the presence of the signal. If a signal is shifted in time, the UE may have trouble to use proper UE beam. In ESTI EN 302.567, an eCCA method may be used. There may be no priority and a fixed max COT length of 5 ms. Using ESTI EN 302.567 may make DRS transmission harder than LAA/NR-U in interference dominated scenario.

Solution 1

In some embodiments, session 5.3.8 of ESTI EN 302.567 may be followed. Here, for example, short control signaling (such as ACK/NACK signals, beacon frames, other sync frames and frames for beamforming) can be initiated even after interference is injected. The short control signaling can be performed 10% of the time within an observation period of 100 ms. DRS, RACH, CSI-RS, and sounding reference signal (SRS) transmission without LBT is allowed. This may ensure regular beam-training RS transmission. In addition, p-CSI, sp-CSI, sr, feedback may be allowed without LBT outside of COT. Normal data traffic may go through eCCA process with random generated numbers.

For a gNB or base station synchronization and beam forming training transmission, the gNB may transmit a synchronization signal block (SSB) burst on a regular schedule. For example, SSB burst configuration with 64 SSB having 20 ms DRS periodicity, and 240 K subcarrier spacing, total overhead (in the time domain) may be around 5.7%. When the gNB obtains the COT, which includes the SSB transmission location as part of the COT, the gNB may transmit the SSB together with other DL transmissions. When the gNB does not obtain the COT due to a CCA failure, the gNB may transmit the SSB at a scheduled location. Here, orthogonal frequency division multiplexing (OFDM) symbols in between SSBs within a DRS are not transmitted, and for other non-SSB occupied resource blocks (RBs) in the SSB symbol, broadcast transmission such as SI, paging, etc, can be transmitted. Alternatively, unicast data can be transmitted in remaining RB(s) of the SSB symbols. To meet the 10% rule (i.e., that short control signaling can be performed 10% of the time within an observation period of e.g., 100 ms), a conservative method is based on configuration, regardless of actual transmission. The conservative method may limit the SSB/CSI-RS configuration. For example, for CSI-RS, gNB may need to ensure CSI-RS configuration together with SSB configuration is less than 10% of time within an observation period. In a more aggressive option, only the SSB and/or CSI-RS transmitted with eCCA is not successful is considered for 10% exception (1st DRS transmission only in this example). For example, gNB may need to ensure CSI-RS transmission together with SSB transmission outside of COT is less than 10% of time within an observation period. If the CSI-RS is within the gNB COT, CSI-RS is transmitted with other transmissions. If the CSI-RS time location in outside of gNB COT, only CSI-RS symbol is transmitted.

For UE synchronization and beam forming training transmission, contention based random access channel (RACH) is configured for a UE to perform initial access, UL sync, request for other SI, beam failure recovery etc. RACH-ConfigCommon index is part of system information block (SIB) 1 message, where RACH-ConfigCommon defines the radio resource available for all the UE in the cell for RACH transmission. The time resource may be periodically configured in TDD FR2 RachConfig table, where periodicity may be derived though system frame number (SFN) and length may be determined with different preamble format.

SRS may be used for UE to perform UL sounding for gNB receiving/transmitting beam training Alternatively, physical uplink control channel (PUCCH) location report request (LRR), which can be used for beam failure recovery, can be considered as part of the short control signaling transmission as well. If any of the configured RACH resources or SRS symbols are within UE acquired COT or gNB shared COT, UE may transmit as scheduled. If any of the configured RACH resource or SRS symbols are outside of UE acquired COT or gNB shared COT, UE may transmit without LBT as short control signaling. To meet the 10% rule (i.e., that short control signaling can be performed 10% of the time within an observation period of e.g., 100 ms), a conservative method is based on configuration, regardless of actual transmission. In another method, only the RACH and/or SRS and/or PUCCH-LRR transmitted with eCCA that is not successful is considered for 10% exception.

Solution 2

The general idea of solution 2 is to allow shorter CCA for sync and beam training symbols, based on the CCA check requirement of ETSI EN 302.567 v2.1.20, 4.2.5.3 4 (d), where the transmission deferring shall last for a minimum of random (0 to Max number) number of empty slots periods and the max number shall not be lower than 3. Here, a gNB may be allowed to choose a max of 3 for CCA sensing for DRS burst. If gNB CCA is successful, an entire SSB burst together with all other transmission can be transmitted within the 5 ms COT. The max of 3 for CCA sensing may be for before CSI-RS transmission. For a UE, the UE can be configured to perform a maximum of 3 for SRS and RACH transmission. Alternatively, the gNB can configure a larger max value in SIB1 for UE to use. This may reduce the contention between gNB and UE and may ensure the gNB has high CCA success for SSB transmission.

FIG. 1 illustrates the operation of an extended clear channel assessment (eCCA) mechanism 100, according to some embodiments. For example, the mechanism may correspond or comply with session 5.3.8 of ESTI EN 302.567. For example, short control signaling (e.g., ACK/NACK signals, beacon frames, other sync frames and frames for beamforming) can be initiated even after interference is injected. The short control signaling can be performed 10% of the time within an observation period of 100 ms. DRS, RACH, CSI-RS, and SRS transmission without LBT is allowed. This may ensure regular beam-training RS transmission. In addition, p-CSI, sp-CSI, sr, feedback may be allowed without LBT outside of COT. Normal data traffic may go through eCCA process with random generated numbers.

The eCCA mechanism 100 may be a listen before talk (LBT) mechanism that is used by a device (e.g., base station, UE) that wants to access (e.g., transmit) on a channel. The mechanism 100 may use eCCA on the channel to determine whether to allow the device to access the channel. Here, the device may sense the channel to determine whether the channel is occupied. First, the device may sense an energy level in the channel and compares it to a threshold. If the energy level in the channel is above the threshold, the channel is presumed to be occupied. If the energy level in the channel is below the threshold, the device continues to sense the channel for a number of slots. For example, the device may first sense the channel for an initial duration, which may be 8 μs, for example. If the energy level in the channel remains below that threshold during this initial part, the eCCA mechanism may proceed to defer its transmission in the channel for a random number (e.g., zero to max number) of slots (which may encompass a different duration than the initial duration, for example, 5 μs) which are below the threshold. When the energy detected during any of these slots during this deferring process is above the threshold, the CCA does not count that slot, but continues to sense the channel and count any subsequent slots during the deferral process that do not have energies that are above the threshold. Once the random number of additional slots have been sensed to have energies be below the threshold, the channel is presumed to be unoccupied. Accordingly, the device is then allowed to occupy (e.g., transmit on, and/or instruct and/or allow other devices to transmit on) the channel for up to a maximum channel occupancy time (COT). In some instances, the maximum COT may be, for example, 5 ms.

For example, a device implementing the mechanism 100 may determine that a channel is unoccupied for an initial duration (e.g., 8 μs) by comparing the energy detected in the channel to a threshold. In some embodiments, the device may begin counting a random number of CCA clear slots 102 and may transmit after N number of CCA clear slots 102 have passed. The mechanism 100 determines whether each slot is clear (i.e., not busy, occupied, or in use) or busy (i.e., in use, occupied, or not clear). After the random number of CCA clear slots 102 are counted (i.e., after the CCA slot 102 at position 0, labeled by numeral 106), transmission may occur. Here, the device is allowed to occupy (e.g., transmit on, and/or instruct and/or allow other devices to transmit on) the channel for up to a maximum channel occupancy time (COT), where the COT may be up to 5 ms. In the embodiment shown, the mechanism 100 deferred its count of CCA clear slots 102 for the duration of the CCA busy slots 104.

For example, the energy in the channel during the CCA busy slots 104 is higher than the threshold.

The threshold used during mechanism 100 may be determinable using one or more formulas that take into account various aspects of the device performing eCCA. The device may use these one or more formulas to determine the threshold that should be used during eCCA. These formulas may incorporate and/or use values that are predetermined. For example, these formulas may use values that are set by an interoperability standard. This may help ensure compatibility/appropriate thresholding within the environment defined by the standard. For example, some threshold formulas for use in NR may make use of a transmit power upper limit applicable to (one or more) devices in the NR system.

These formulas may further be tailored such that the channel can be fairly shared as between devices with weaker transmission powers and devices with stronger transmission powers. For example, a device with a relatively stronger transmission power (e.g., a base station) may, generally speaking, through the use of the formula, calculate a threshold that is lower than a threshold calculated by a device with a relatively weaker transmission power (e.g., a UE) that uses the same formula. Accordingly, devices with relatively weaker transmission powers have a relatively increased likelihood of passing the eCCA, and therefore the channel will not necessarily always be taken by devices with larger transmission powers (which could otherwise crowd out the smaller transmission power devices during eCCA as a result of their larger transmission powers). The lower threshold for devices with weaker transmission powers may also be appropriate because these devices do not require as much of the channel, spatially speaking, when transmitting as compared to devices with stronger transmission powers.

For example, the equivalent isotropic radiated power (EIRP) for the transmission that the device wishes to perform in the channel may be known or estimated prior to the performance of the eCCA. A formula may account for this may by providing devices using higher EIRPs a lower threshold, which may them comparatively less likely to pass the eCCA.

Back to FIG. 1, for base station (e.g., gNB) synchronization and beam forming training transmission, the base station may transmit a synchronization signal block (SSB) 108 on a regular schedule according to DRS periodicity 110. In some embodiments, 64 SSB are transmitted, the DRS periodicity is 20 ms, and subcarrier spacing is 240 K. Here, total overhead may be around 5.7% in the time domain.

In some embodiments, after the random number of CCA clear slots 102 are counted (i.e., after the CCA slot 102 at position 0, labeled by numeral 106), the device is allowed to occupy (e.g., transmit on, and/or instruct and/or allow other devices to transmit on) the channel for up to a maximum COT, which may be 5 ms. In the embodiment shown, the base station may occupy the channel as shown by transmission or instructed/allowed transmission 112, which includes the SSB together with other DL data transmissions such as those on the physical downlink control channel (PDCCH) and/or physical data shared channel (PDSCH). The device (e.g., gNB or base station) can also scheme UE to transmit on a physical uplink shared channel (PUSCH) and/or physical uplink control channel (PUCCH) within the COT (where the COT may be 5 ms, for example), thereby sharing the COT with the UE.

In some embodiments, when the base station does not obtain COT due to CCA failure (e.g., the random number of CCA clear slots 102 are not counted), the base station may transmit the SSB 108 at a scheduled location, shown by reference numeral 114. In some embodiments, orthogonal frequency division multiplexing (OFDM) symbols in between SSBs within a DRS are not transmitted. In some embodiments, CSI-RS may not be transmitted within the DRS. In some embodiments, for other non-SSB occupied resource blocks (RBs) in an SSB symbol, broadcast transmission such as SI, paging, etc. can be transmitted. In some embodiments, unicast data can be transmitted in remaining RB(s) of the SSB symbols.

To meet the 10% rule (i.e., that short control signaling can be performed 10% of the time within an observation period of e.g., 100 ms), a conservative method is based on configuration, regardless of actual transmission. A more aggressive option is may limit the SSB/CSI-RS configuration. In this case, only the SSB and/or CSI-RS transmitted with eCCA is not successful is considered for 10% exception (1st DRS transmission only in this example).

Figure 2:
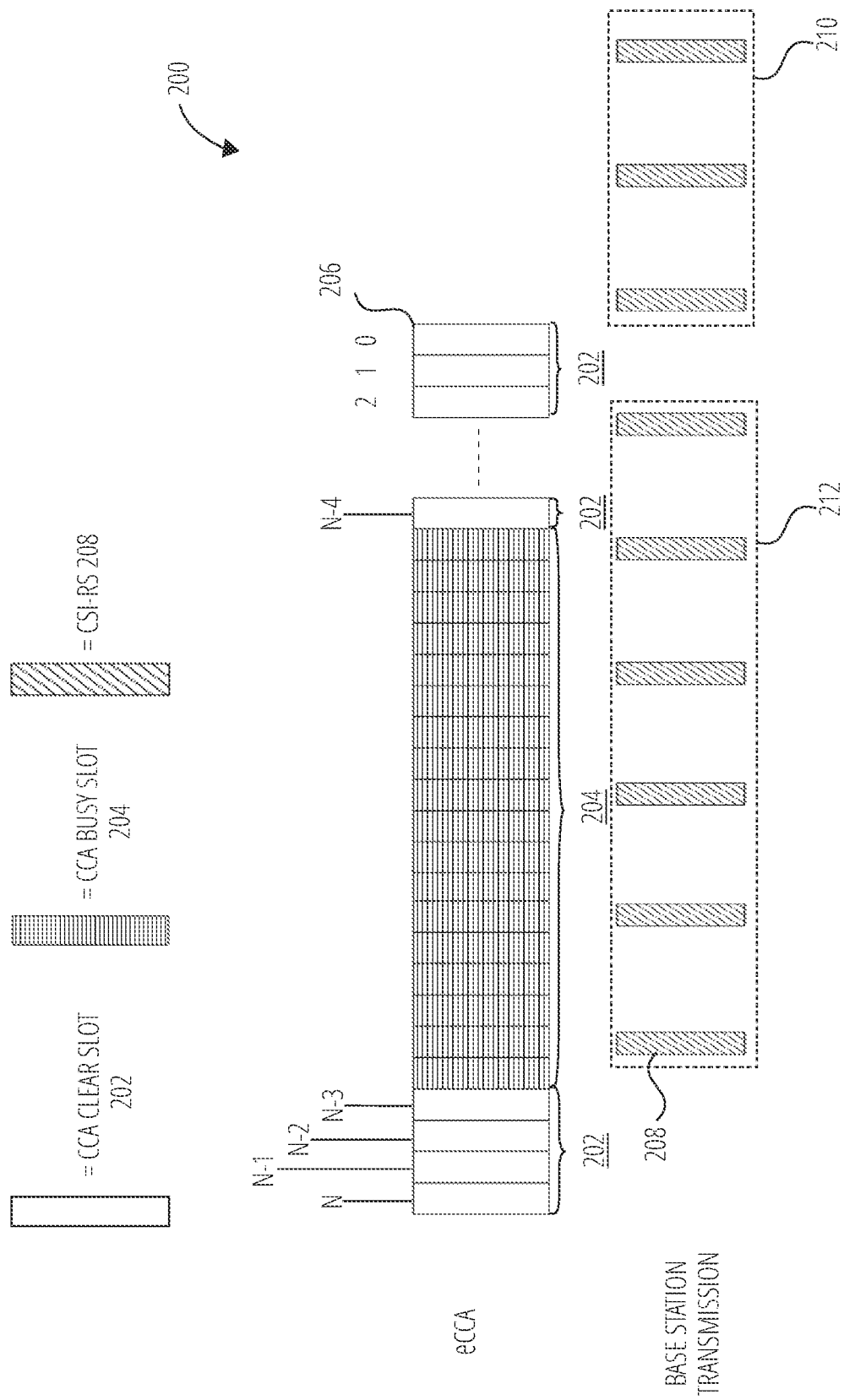
FIG. 2 illustrates CSI-RS transmission operation of the mechanism of FIG. 1 according to some embodiments.

FIG. 2 illustrates the operation CSI-RS transmission 200 in mechanism 100, according to some embodiments. In some embodiments, for CST-RS, a device (e.g., base station or gNB) may need to ensure CSI-RS configuration together with SSB configuration is transmitted less than 10% of time within an observation period. In the embodiment shown, similar to the discussion above, the mechanism 100 may determine that a channel is unoccupied for an initial duration (e.g., 8 µs) by comparing the energy detected in the channel to a threshold. In some embodiments, the device may begin counting a random number of CCA clear slots 202 and may transmit after N number of clear CCA slots 202 have passed. The mechanism 100 determines whether each slot is clear (i.e., not busy or in use) or busy (i.e., in use or not clear). Slots 202 are CCA clear slots and slots 204 are CCA busy slots. After the random number of CCA clear slots 202 are counted (i.e., after the CCA slot 202 at position 0, labeled by numeral 206), transmission may occur. Here, the device is allowed to occupy (e.g., transmit on, and/or instruct and/or allow other devices to transmit on) the channel for up to a maximum channel occupancy time (COT), where the COT may be up to 5 ms. In the embodiment shown, the mechanism 100 deferred its count of CCA clear slots 202 for the duration of the CCA busy slots 204. This is the energy in the channel during the CCA busy slots 204 is higher than the threshold.

After the random number of CCA clear slots 202 are counted (i.e., after the CCA slot 202 at position 0, labeled by numeral 206), the device is allowed to occupy (e.g., transmit on, and/or instruct and/or allow other devices to transmit on) the channel for up to a maximum COT, which may be 5 ms. In the embodiment shown, the base station may occupy the channel as shown by transmission or instructed/allowed transmission 210, which is the CSI-RS 208 transmitted with other transmissions such as those on the PUCCH and/or PUSCH. The device (e.g., gNB or base station) can also scheme a UE to transmit on a PUSCH and/or PUCCH within the COT. If the CSI-RS time location is outside of base station COT (i.e., before the random number of CCA clear slots 202 are counted), only CSI-RS symbol(s) 208 are transmitted, as shown by reference numeral 212.

Figure 3:
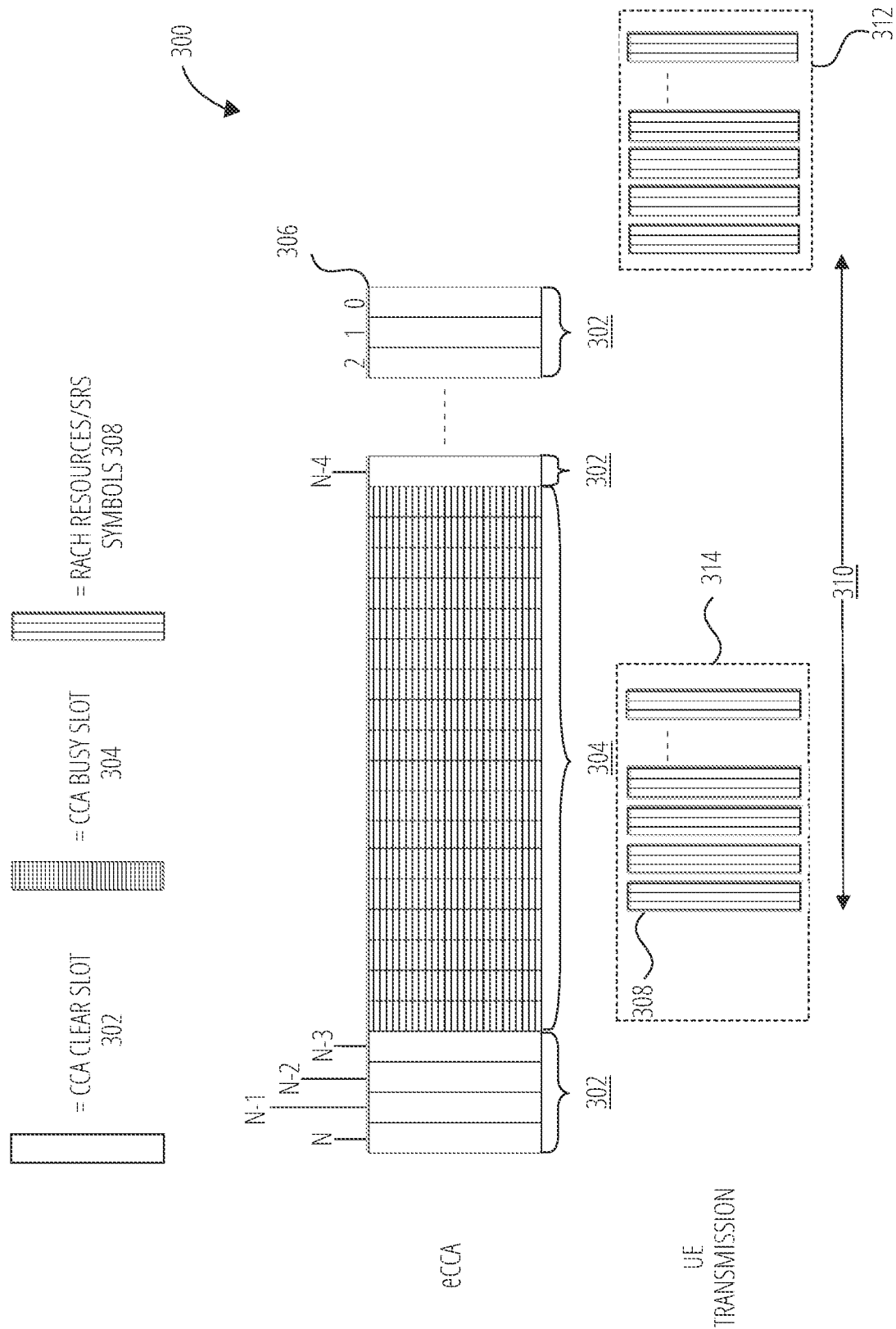
FIG. 3 illustrates operation of another eCCA mechanism according to some embodiments.

FIG. 3 illustrates the operation of an extended clear channel assessment (eCCA) mechanism 300, according to some embodiments. In some embodiments, for UE synchronization and beam forming training transmission, contention based random access channel (RACH) is configured for a UE to perform initial access, UL sync, request for other SI, beam failure recovery, etc. For example, RACH-Config-Common index may be part of system information block (SIB) 1 message, where RACH-ConfigCommon may define the radio resource available for all the UE in the cell for RACH transmission. The time resource may be periodically configured in TDD FR2 RachConfig table, where periodicity may be derived though system frame number (SFN) and length may be determined with different preamble format. SRS may be used for UE to perform UL sounding for base station receiving/transmitting beam training Alternatively, physical uplink control channel (PUCCH) location report request (LRR), which can be used for beam failure recovery, can be considered as part of the short control signaling transmission as well.

Turning to FIG. 3, a UE implementing the mechanism 300 may determine that a channel is unoccupied for an initial duration (e.g., 8 μs) by comparing the energy detected in the channel to a threshold. In some embodiments, the device may begin counting a random number of CCA clear slots 302 and may transmit after N number of clear CCA slots 302 have passed. The mechanism 300 determines whether each slot is clear (i.e., not busy or in use) or busy (i.e., in use or not clear). Slots 302 are CCA clear slots and slots 304 are CCA busy slots. After the random number of CCA clear slots 302 are counted (i.e., after the CCA slot 302 at position 0, labeled by numeral 306), transmission may occur. Here, the UE is allowed to occupy (e.g., transmit on, and/or instruct and/or allow other devices to transmit on) the channel for up to a maximum channel occupancy time (COT), where the COT may be up to 5 ms. In the embodiment shown, the mechanism 300 deferred its count of CCA clear slots 302 for the duration of the CCA busy slots 304. This is the energy in the channel during the CCA busy slots 304 is higher than the threshold.

The threshold used during mechanism 300 may be determinable as described above with reference to FIG. 1. Back to FIG. 3, in some embodiments, after the random number of CCA clear slots 302 are counted (i.e., after the CCA slot 302 at position 0, labeled by numeral 306), the UE is allowed to occupy (e.g., transmit on, and/or instruct and/or allow other devices to transmit on) the channel for up to a maximum COT, which may be 5 ms, as scheduled. In the embodiment shown, the UE may occupy the channel and any of the configured RACH resources or SRS symbols 308 within UE acquired COT (or gNB shared COT), shown by numeral 312, are transmitted by the UE as scheduled. If any of the configured RACH resource or SRS symbols 308 are outside of UE acquired COT (or gNB shared COT), as shown by numeral 314, the UE may transmit them without LBT as short control signaling.

To meet the 10% rule (i.e., that short control signaling can be performed 10% of the time within an observation period of e.g., 100 ms), a conservative method is based on configuration, regardless of actual transmission. In another method, only the RACH and/or SRS and/or PUCCH-LRR transmitted with eCCA that is not successful is considered for 10% exception.

Figure 4A:
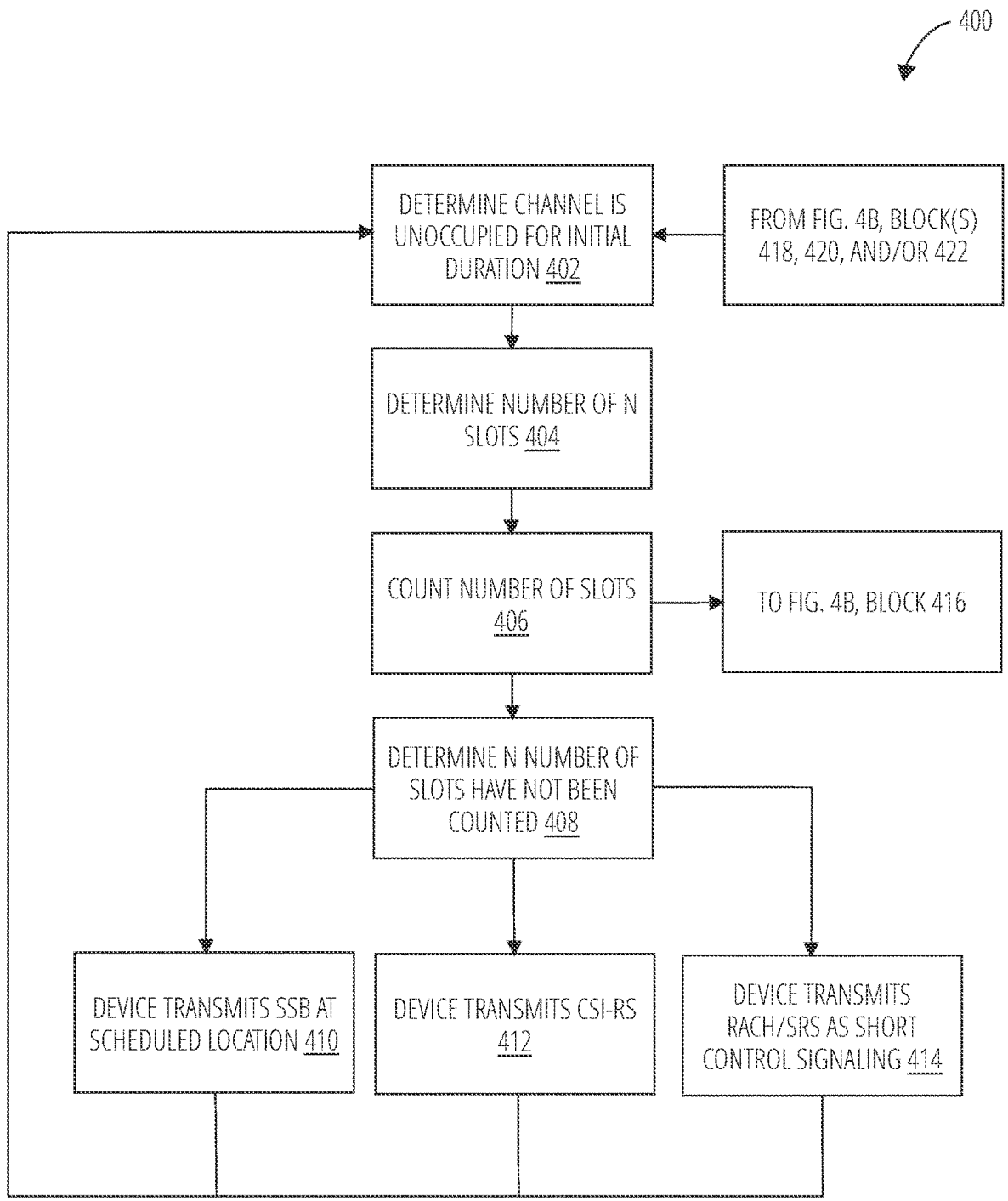
FIG. 4A and FIG. 4B illustrate a process for implementing eCCA mechanisms of the present disclosure in accordance with some embodiments.
Figure 4B:
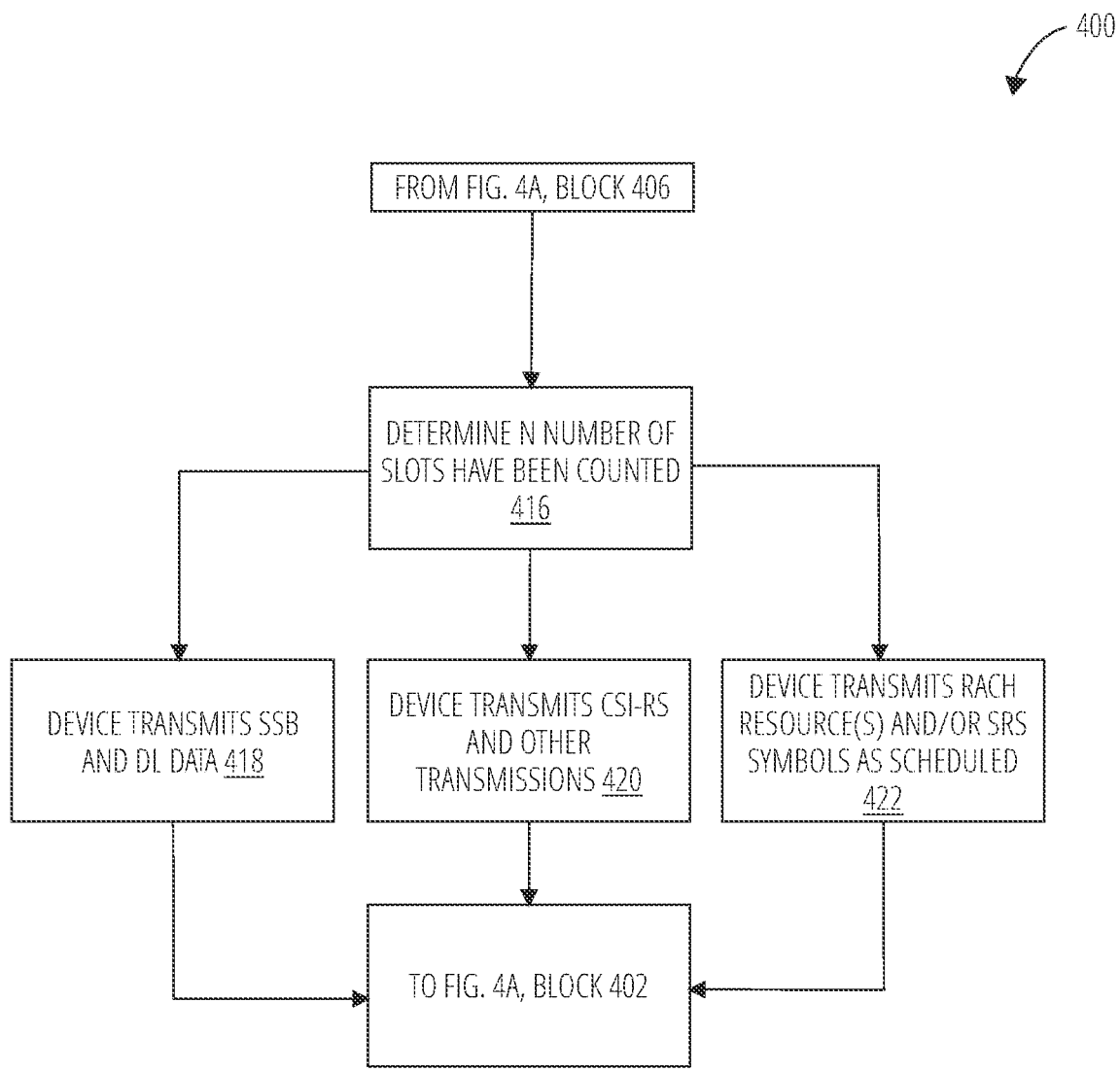

FIG. 4A and FIG. 4B show a Process 400 for implementing mechanisms of the present disclosure in accordance with some embodiments. It should be noted that the order of blocks in Process 400 may be the same or different than that shown in FIGS. 4A and 4B and discussed herein, that one or more blocks may be excluded, and that one or more additional blocks including additional process aspects may be included.

At block 402, a device (e.g., base station, UE) determines whether a channel is unoccupied for an initial duration. In some embodiments, the initial duration is 8 μs. In some embodiments, the device determines whether the channel is unoccupied by comparing detected energy of the channel to a threshold. The threshold may be determinable as discussed with respect to FIG. 1. If the energy level in the channel is above the threshold, the channel is presumed to be occupied. If the energy level in the channel is below the threshold, the process continues block 404 to sense the channel for a number of slots. For example, as noted, the process may first sense the channel for an initial duration (e.g., 8 μs). If the energy level in the channel remains below the threshold during this initial duration, the eCCA process may proceed to defer its transmission in the channel for a random number (zero to max number) of slots (which may be of a different duration than the initial duration, for example, 5 μs slot times) which are below the threshold.

At block 404, the device determines a number N of CCA clear slots of the channel to defer for transmission in the channel. In some embodiments, the number of CCA clear slots is a random number (e.g., from zero to a max number) of slots which are below the threshold. In some embodiments, the max number is 3. In some embodiments, the number of CCA clear slots is encompassed by a time duration that may be the same or different to the initial duration discussed with reference to block 402. In some embodiments, this time duration is 5 μs.

At block 406, the device counts the random number of CCA clear slots according to the time duration. In some embodiments, the device determines whether a slot is clear (not in use) or busy (in use) by comparing energy of the slot to the threshold. A slot may be clear if its energy is below the threshold. A slot may be busy if its energy is at or above the threshold.

At block 408, the device determines that the N number of slots have not been counted and a CCA failure occurred (e.g., COT is not obtained). Here, for example, Process 400 may proceed to one or more of blocks 410, 412, and/or 414, where certain data unit(s) are transmitted by the device. Process 400 may then return to block 402.

In block 410, the device may transmit SSB at a scheduled time location. In some embodiments, orthogonal frequency division multiplexing (OFDM) symbols in between SSBs within a DRS are not transmitted. In some embodiments, CSI-RS may not be transmitted within the DRS. In some embodiments, for other non-SSB occupied resource blocks (RBs) in an SSB symbol, broadcast transmission such as SI, paging, etc. can be transmitted. In some embodiments, unicast data can be transmitted in remaining RB(s) of the SSB symbols. In block 412, the device may transmit only CSI-RS symbol(s). In block 414, the device may transmit configured RACH resource or SRS symbol(s) without LBT as short control signaling. In some embodiments, in one, some, or all of block 410, 412, or 414, the transmitting may use short control signaling. In some embodiments, process 400 therefore provides that the transmission of signals as described for blocks 410, 412, and/or 414 may occur even without CCA success (e.g., when CCA failure occurs and COT is not obtained).

Back to block 406, as discussed, the device counts the random number of CCA clear slots according to the time duration. At block 416 (FIG. 4B), the device determines that the N number of slots have been counted and CCA success has occurred (e.g., the device has obtained COT). The device may be allowed to occupy (e.g., transmit on, and/or instruct and/or allow other devices to transmit on) the channel for up to a maximum channel occupancy time (COT), where the COT may be up to 5 ms. Here, for example, Process 400 may proceed to one or more of blocks 418, 420, and/or 422, where certain data unit(s) are transmitted by the device.

At block 418, the device may transmit SSB symbol(s) together with other DL data transmissions such as those on the PDCCH and/or PUSCH. The device (e.g., when a gNB or base station) can also scheme a UE to transmit on a PUSCH and/or PUCCH within the COT (where the COT may be 5 ms, for example), such that the COT is shared with the UE. At block 420, the device may transmit CSI-RS with other transmissions such as those on PDCCH and/or PUSCH. Here too, the device (e.g., when a gNB or base station) can also scheme a UE to transmit on a PUSCH and/or PUCCH within the COT. At block 422, the device may transmit configured RACH resources and/or SRS symbols as scheduled.

In some embodiments, modifications to the mechanisms discussed herein may be provided. In some embodiments, shorter CCA for synchronization and beam training may be performed (e.g., based on the CCA check requirement of ETSI EN 302.567 v2.1.20, 4.2.5.3 4 (d)), where the transmission deferring shall last for a minimum of a random (0 to Max number) number of empty slots periods and the max number shall not be lower than 3. Here, a device (e.g., gNB) may be allowed to choose a maximum of 3 for CCA sensing for DRS burst (i.e., Max number=3). In some embodiments, if the CCA is successful, an entire SSB burst together with all other transmissions can be transmitted within a COT (e.g., a 5 ms COT). In some embodiments, if the CCA is successful, CSI-RS transmission may occur.

In some embodiments, for a UE, the UE can be configured to perform deferring for a maximum of 3 empty slots, and then transmit SRS and RACH. Alternatively, the gNB can configure a larger max value in SIB1 for the UE to use. For example, this arrangement may reduce the contention between gNB and UE and may ensure the gNB has high CCA success for SSB transmission.

Figure 5:
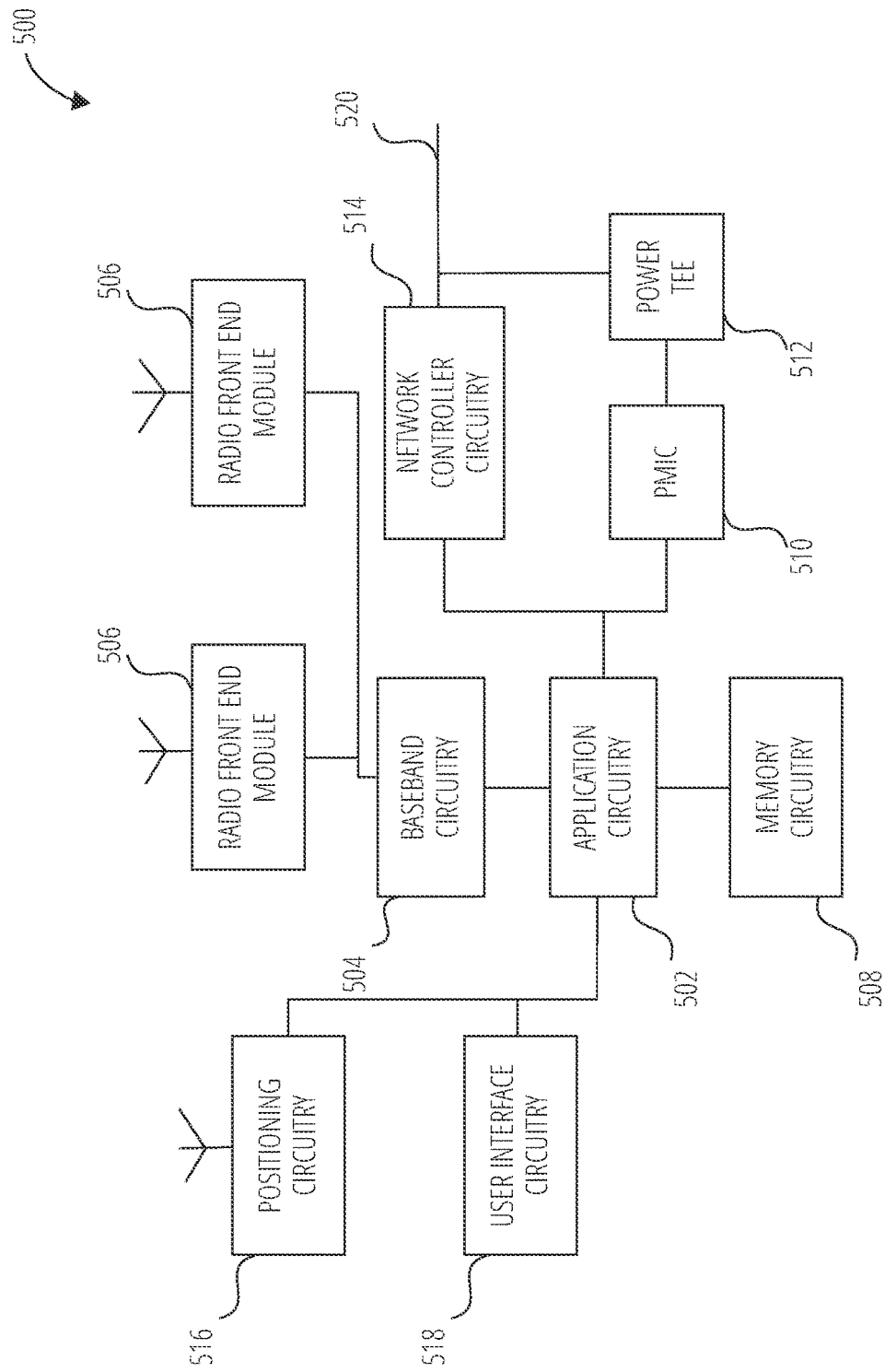
FIG. 5 illustrates an infrastructure equipment in accordance with some embodiments.

FIG. 5 illustrates an example of infrastructure equipment 500 in accordance with various embodiments. The infrastructure equipment 500 may be implemented as a base station, radio head, RAN node, AN, application server, and/or any other element/device discussed herein. In other examples, the infrastructure equipment 500 could be implemented in or by a UE.

The infrastructure equipment 500 includes application circuitry 502, baseband circuitry 504, one or more radio front end module 506 (RFEM), memory circuitry 508, power management integrated circuitry (shown as PMIC 510), power tee circuitry 512, network controller circuitry 514, network interface connector 520, satellite positioning circuitry 516, and user interface circuitry 518. In some embodiments, the device infrastructure equipment 500 may include additional elements such as, for example, memory/storage, display, camera, sensor, or input/output (I/O) interface. In other embodiments, the components described below may be included in more than one device. For example, said circuitries may be separately included in more than one device for CRAM, vBBU, or other like implementations. Application circuitry 502 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 502 may be coupled with or may include memory/storage elements and may be configured to execute instructions stored in the memory/storage to enable various applications or operating systems to run on the infrastructure equipment 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 502 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 502 may comprise, or may be, a special-purpose processor/controller to operate according to the various embodiments herein. As examples, the processor(s) of application circuitry 502 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 500 may not utilize application circuitry 502, and instead may include a special-purpose processor/controller to process IP data received from an EPC or 5GC, for example.

In some implementations, the application circuitry 502 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 502 may comprise logic blocks or logic fabric, and other interconnected resources that may be programmed to perform various functions, such as the procedures, methods, functions, etc. of the various embodiments discussed herein. In such embodiments, the circuitry of application circuitry 502 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 504 may be implemented, for example, as a solder-down substrate including one or more integrated circuits, a single packaged integrated circuit soldered to a main circuit board or a multi-chip module containing two or more integrated circuits.

The user interface circuitry 518 may include one or more user interfaces designed to enable user interaction with the infrastructure equipment 500 or peripheral component interfaces designed to enable peripheral component interaction with the infrastructure equipment 500. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 506 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 506, which incorporates both mmWave antennas and sub-mmWave.

The memory circuitry 508 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 508 may be implemented as one or more of solder down packaged integrated circuits, socketed memory modules and plug-in memory cards.

The PMIC 510 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 512 may provide for electrical power drawn from a network cable to provide both power supply and data connectivity to the infrastructure equipment 500 using a single cable.

The network controller circuitry 514 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 500 via network interface connector 520 using a physical connection, which may be electrical (commonly referred to as a "copper interconnect"), optical, or wireless. The network controller circuitry 514 may include one or more dedicated processors and/or FPGAs to communicate using one or more of the aforementioned protocols. In some implementations, the network controller circuitry 514 may include multiple controllers to provide connectivity to other networks using the same or different protocols.

The positioning circuitry 516 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 516 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 516 may include a Micro-Technology for Positioning, Navigation, and Timing (Micro-PNT) IC that uses a master timing clock to perform position tracking/estimation without GNSS assistance. The positioning circuitry 516 may also be part of, or interact with, the baseband circuitry 504 and/or radio front end module 506 to communicate with the nodes and components of the positioning network. The positioning circuitry 516 may also provide position data and/or time data to the application circuitry 502, which may use the data to synchronize operations with various infrastructure, or the like. The components shown by FIG. 5 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I$^2$C interface, an SPI interface, point to point interfaces, and a power bus, among others.

Figure 6:
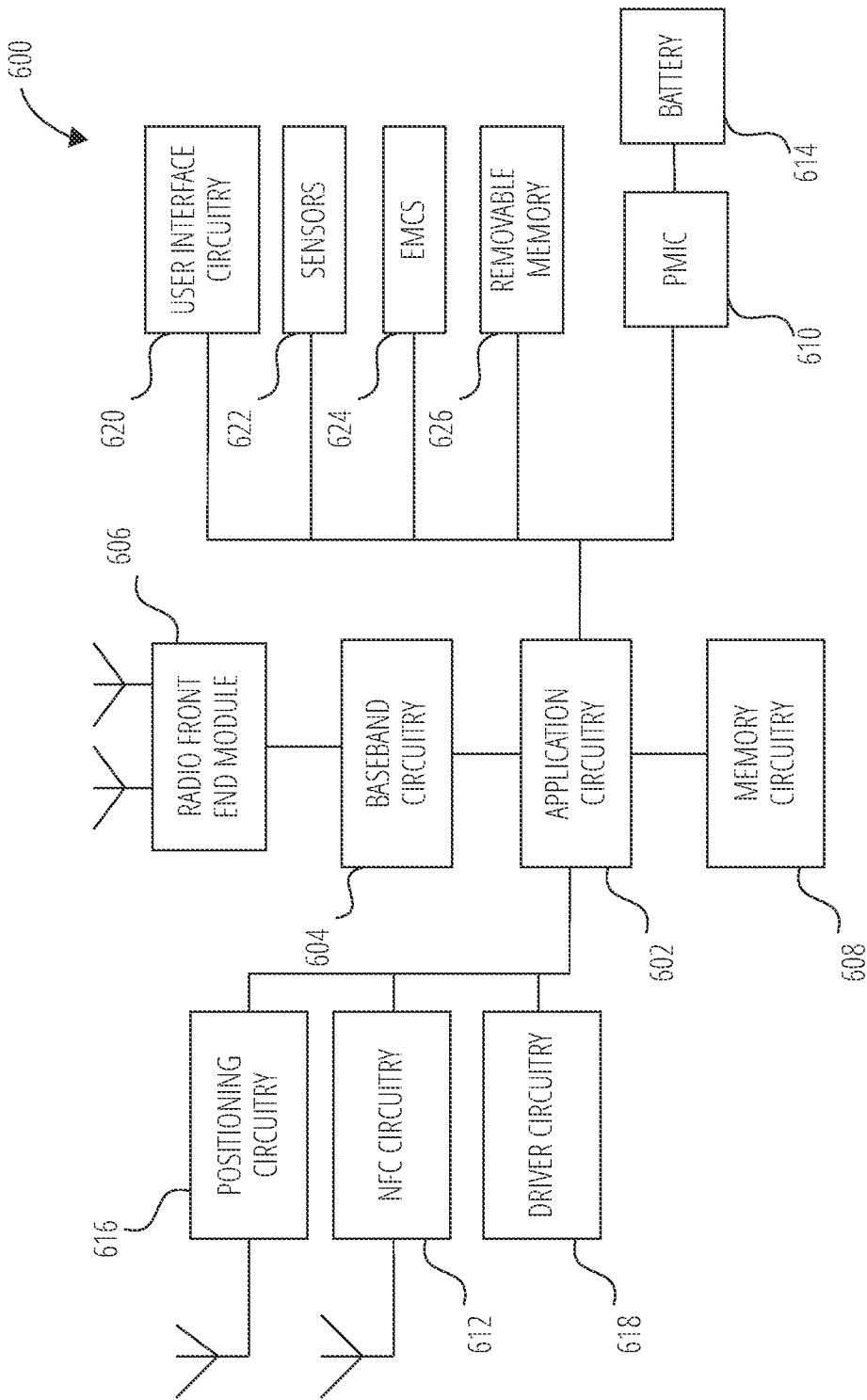
FIG. 6 illustrates a platform in accordance with some embodiments.

FIG. 6 illustrates an example of a platform 600 in accordance with various embodiments. In embodiments, the computer platform 600 may be suitable for use as UEs, application servers, and/or any other element/device discussed herein. The platform 600 may include any combinations of the components shown in the example. The components of platform 600 may be implemented as integrated circuits (ICs), portions thereof, discrete electronic devices, or other modules, logic, hardware, software, firmware, or a combination thereof adapted in the computer platform 600, or as components otherwise incorporated within a chassis of a larger system. The block diagram of FIG. 6 is intended to show a high level view of components of the computer platform 600. However, some of the components shown may be omitted, additional components may be present, and different arrangement of the components shown may occur in other implementations.

Application circuitry 602 includes circuitry such as, but not limited to one or more processors (or processor cores), cache memory, and one or more of LDOs, interrupt controllers, serial interfaces such as SPI, I$^2$C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 602 may be coupled with or may include memory/storage elements and may be configured to execute instructions stored in the memory/storage to enable various applications or operating systems to run on the platform 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 602 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 602 may comprise, or may be, a special-purpose processor/controller to operate according to the various embodiments herein.

As examples, the processor(s) of application circuitry 602 may include an Intel® Architecture Core™ based processor, such as a Quark™, an Atom™, an i3, an i5, an i7, or an MCU-class processor, or another such processor available from Intel® Corporation. The processors of the application circuitry 602 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 602 may be a part of a system on a chip (SoC) in which the application circuitry 602 and other components are formed into a single integrated circuit, or a single package, such as the Edison™ or Galileo™ SoC boards from Intel® Corporation.

Additionally or alternatively, application circuitry 602 may include circuitry such as, but not limited to, one or more a field-programmable devices (FPDs) such as FPGAs and the like; programmable logic devices(PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 602 may comprise logic blocks or logic fabric, and other interconnected resources that may be programmed to perform various functions, such as the procedures, methods, functions, etc. of the various embodiments discussed herein. In such embodiments, the circuitry of application circuitry 602 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 604 may be implemented, for example, as a solder-down substrate including one or more integrated circuits, a single packaged integrated circuit soldered to a main circuit board or a multi-chip module containing two or more integrated circuits.

The radio front end module 606 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 606, which incorporates both mmWave antennas and sub-mmWave.

The memory circuitry 608 may include any number and type of memory devices used to provide for a given amount of system memory. As examples, the memory circuitry 608 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 608 may be developed in accordance with a Joint Electron Devices Engineering Council (JEDEC) low power double data rate (LPDDR)-based design, such as LPDDR2, LPDDR3, LPDDR4, or the like. Memory circuitry 608 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 608 maybe on-die memory or registers associated with the application circuitry 602. To provide for persistent storage of information such as data, applications, operating systems and so forth, memory circuitry 608 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 600 may incorporate the three-dimensional (3D) cross-point (XPOINT) memories from Intel® and Micron®.

The removable memory 626 may include devices, circuitry, enclosures/housings, ports or receptacles, etc. used to couple portable data storage devices with the platform 600. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 600 may also include interface circuitry (not shown) that is used to connect external devices with the platform 600. The external devices connected to the platform 600 via the interface circuitry include sensors 622 and electro-mechanical components (shown as EMCs 624), as well as removable memory devices coupled to removable memory 626.

The sensors 622 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 624 include devices, modules, or subsystems whose purpose is to enable platform 600 to change its state, position, and/or orientation, or move or control a mechanism or (sub)system. Additionally, EMCs 624 may be configured to generate and send messages/signaling to other components of the platform 600 to indicate a current state of the EMCs 624. Examples of the EMCs 624 include one or more power switches, relays including electromechanical relays (EMRs) and/or solid state relays (SSRs), actuators (e.g., valve actuators, etc.), an audible sound generator, a visual warning device, motors DC motors, stepper motors, etc.), wheels, thrusters, propellers, claws, clamps, hooks, and/or other like electro-mechanical components. In embodiments, platform 600 is configured to operate one or more EMCs 624 based on one or more captured events and/or instructions or control signals received from a service provider and/or various clients. In some implementations, the interface circuitry may connect the platform 600 with positioning circuitry 616. The positioning circuitry 616 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou. Navigation Satellite System, a regional navigation system or GNSS augmentation system (e.g., NAVIC), Japan's QZSS, France's DORIS, etc.), or the like. The positioning circuitry 616 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 616 may include a Micro-PNT IC that uses a master timing clock to perform position tracking/estimation without GNSS assistance. The positioning circuitry 616 may also be part of, or interact with, the baseband circuitry 604 and/or radio front end module 606 to communicate with the nodes and components of the positioning network. The positioning circuitry 616 may also provide position data and/or time data to the application circuitry 602, which may use the data to synchronize operations with various infrastructure (e.g., radio base stations), for turn-by-turn navigation applications, or the like.

In some implementations, the interface circuitry may connect the platform 600 with Near-Field Communication circuitry (shown as NFC circuitry 612). The NFC circuitry 612 is configured to provide contactless, short-range communications based on radio frequency identification (RFID) standards, wherein magnetic field induction is used to enable communication between NFC circuitry 612 and NFC-enabled devices external to the platform 600 (e.g., an "NFC touchpoint"). NFC circuitry 612 comprises an NFC controller coupled with an antenna element and a processor coupled with the NFC controller. The NFC controller may be a chip/IC providing NFC functionalities to the NFC circuitry 612 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 612, or initiate data transfer between the NFC circuitry 612 and another active NFC device (e.g., a smartphone or an NFC-enabled POS terminal) that is proximate to the platform 600.

The driver circuitry 618 may include software and hardware elements that operate to control particular devices that are embedded in the platform 600, attached to the platform 600, or otherwise communicatively coupled with the platform 600. The driver circuitry 618 may include individual drivers allowing other components of the platform 600 to interact with or control various input/output (I/O) devices that may be present within, or connected to, the platform 600. For example, driver circuitry 618 may include a display driver to control and allow access to a display device, a touchscreen driver to control and allow access to a touchscreen interface of the platform 600, sensor drivers to obtain sensor readings of sensors 622 and control and allow access to sensors 622, EMC drivers to obtain actuator positions of the EMCs 624 and/or control and allow access to the EMCs 624, a camera driver to control and allow access to an embedded image capture device, audio drivers to control and allow access to one or more audio devices.

The power management integrated circuitry (shown as PMIC 610) (also referred to as "power management circuitry") may manage power provided to various components of the platform 600. In particular, with respect to the baseband circuitry 604, the PMIC 610 may control power-source selection, voltage scaling, battery charging, or DC-to-DC conversion. The PMIC 610 may often be included when the platform 600 is capable of being powered by a battery 614, for example, when the device is included in a UE.

In some embodiments, the PMIC 610 may control, or otherwise be part of, various power saving mechanisms of the platform 600. For example, if the platform 600 is in an RRC_Connected state, where it is still connected to the RAN node as it expects to receive traffic shortly, then it may enter a state known as Discontinuous Reception Mode (DRX) after a period of inactivity. During this state, the platform 600 may power down for brief intervals of time and thus save power. If there is no data traffic activity for an extended period of time, then the platform 600 may transition off to an RRC_Idle state, where it disconnects from the network and does not perform operations such as channel quality feedback, handover, etc. The platform 600 goes into a very low power state and it performs paging where again it periodically wakes up to listen to the network and then powers down again. The platform 600 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 614 may power the platform 600, although in some examples the platform 600 may be mounted deployed in a fixed location, and may have a power supply coupled to an electrical grid. The battery 614 may be a lithium ion battery, a metal-air battery, such as a zinc-air battery, an aluminum-air battery, a lithium-air battery, and the like. In some implementations, such as in V2X applications, the battery 614 may be a typical lead-acid automotive battery.

In some implementations, the battery 614 may be a "smart battery," which includes or is coupled with a Battery Management System (BMS) or battery monitoring integrated circuitry. The BMS may be included in the platform 600 to track the state of charge (SoCh) of the battery 614. The BMS may be used to monitor other parameters of the battery 614 to provide failure predictions, such as the state of health (SoH) and the state of function (SoF) of the battery 614. The BMS may communicate the information of the battery 614 to the application circuitry 602 or other components of the platform 600. The BMS may also include an analog-to-digital (ADC) convertor that allows the application circuitry 602 to directly monitor the voltage of the battery 614 or the current flow from the battery 614. The battery parameters may be used to determine actions that the platform 600 may perform, such as transmission frequency, network operation, sensing frequency, and the like.

A power block, or other power supply coupled to an electrical grid may be coupled with the BMS to charge the battery 614. In some examples, the power block may be replaced with a wireless power receiver to obtain the power wirelessly, for example, through a loop antenna in the computer platform 600. In these examples, a wireless battery charging circuit may be included in the BMS. The specific charging circuits chosen may depend on the size of the battery 614, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 620 includes various input/output (I/O) devices present within, or connected to, the platform 600, and includes one or more user interfaces designed to enable user interaction with the platform 600 and/or peripheral component interfaces designed to enable peripheral component interaction with the platform 600. The user interface circuitry 620 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 600. The output device circuitry may also include speakers or other audio emitting devices, printer(s), and/or the like. In some embodiments, the sensors 622 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 600 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I$^2$C interface, an SPI interface, point-to-point interfaces, and a power bus, among others.

Figure 7:
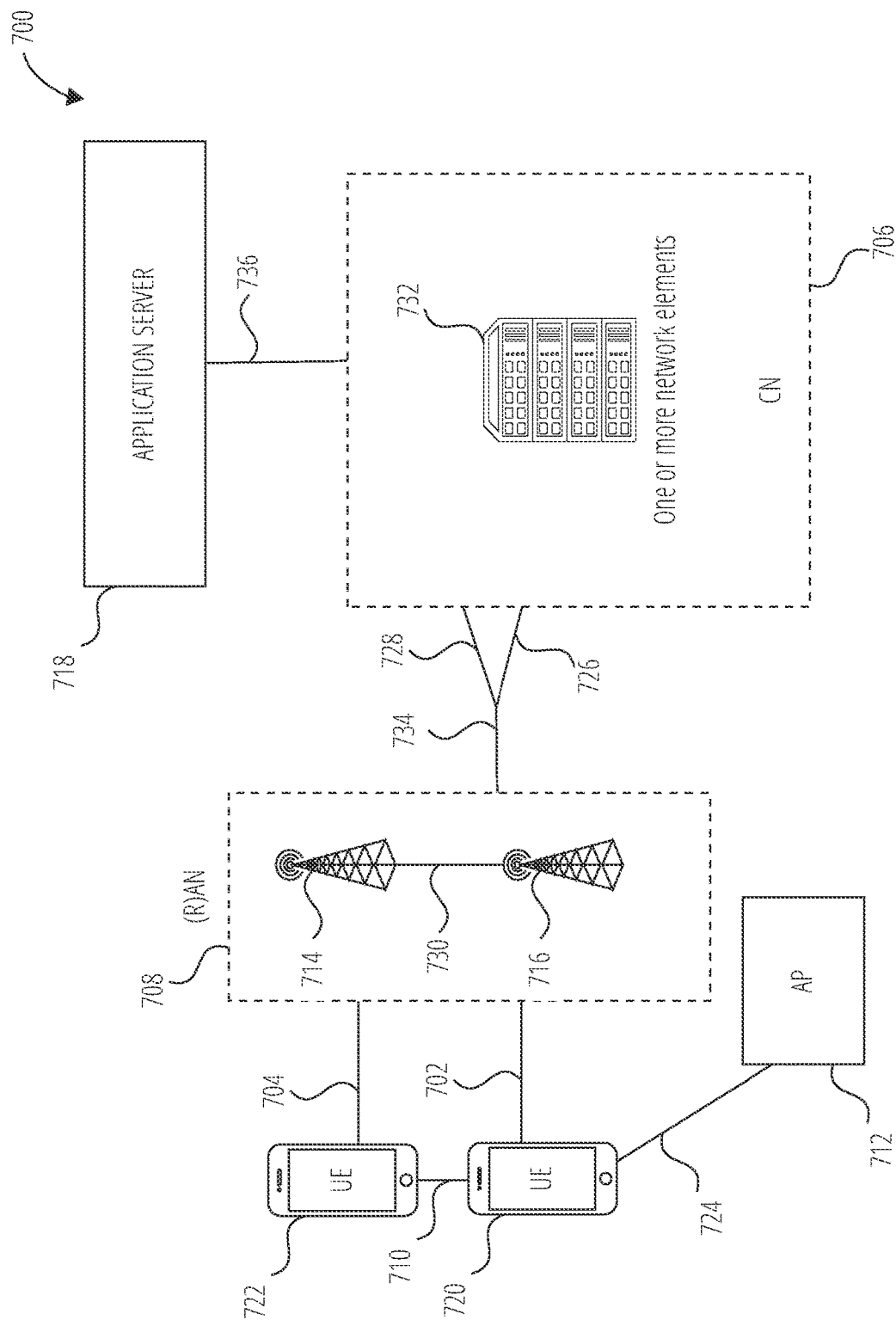
FIG. 7 illustrates a system in accordance with some embodiments.

FIG. 7 illustrates an example architecture of a system 700 of a network, in accordance with various embodiments. The following description is provided for an example system 700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 7, the system 700 includes UE 722 and UE 720. In this example, the UE 722 and the UE 720 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 722 and/or the UE 720 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 722 and UE 720 may be configured to connect, for example, communicatively couple, with an access node or radio access node (shown as (R)AN 708). In embodiments, the (R)AN 708 may be an NG RAN or a 5G RAN, an E-UTRAN, or a legacy RAN, such as a UTRAN or GERAN. As used herein, the term "NG RAN" or the like may refer to a (R)AN 708 that operates in an NR or 5G system, and the term "E-UTRAN" or the like may refer to a (R)AN 708 that operates in an LTE or 4G system. The UE 722 and UE 720 utilize connections (or channels) (shown as connection 704 and connection 702, respectively), each of which comprises a physical communications interface or layer (discussed in further detail below).

In this example, the connection 704 and connection 702 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 722 and UE 720 may directly exchange communication data via a ProSe interface 710. The ProSe interface 710 may alternatively be referred to as a sidelink (SL) interface and may comprise one or more logical channels, including but not limited to a PSCCH, a PSSCH, a PSDCH, and a PSBCH.

The UE 720 is shown to be configured to access an AP 712 (also referred to as "WLAN node," "WLAN," "WLAN Termination," "WT" or the like) via connection 724. The connection 724 can comprise a local wireless connection, such as a connection consistent with any IEEE 802.11 protocol, wherein the AP 712 would comprise a wireless fidelity (Wi-Fi®) router. In this example, the AP 712 may be connected to the Internet without connecting to the core network of the wireless system (described in further detail below). In various embodiments, the UE 720, (R)AN 708, and AP 712 may be configured to utilize LWA operation and/or LWIP operation. The LWA operation may involve the UE 720 in RRC_CONNECTED being configured by the RAN node 714 or the RAN node 716 to utilize radio resources of LTE and WLAN. LWIP operation may involve the UE 720 using WLAN radio resources (e.g., connection 724) via IPsec protocol tunneling to authenticate and encrypt packets (e.g., IP packets) sent over the connection 724. IPsec tunneling may include encapsulating the entirety of original IP packets and adding a new packet header, thereby protecting the original header of the IP packets.

The (R)AN 708 can include one or more AN nodes, such as RAN node 714 and RAN node 716, that enable the connection 704 and connection 702. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 700 (e.g., an eNB). According to various embodiments, the RAN node 714 or RAN node 716 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 714 or RAN node 716 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 714 or RAN node 716); a MAC/PHY split wherein RRC, PDCP, RLC, and MAC layers are operated by the CRAN/vBBUP and the PHY layer is operated by individual RAN nodes (e.g., RAN node 714 or RAN node 716); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 714 or RAN node 716 to perform other virtualized applications. In some implementations, an individual RAN node may represent individual gNB-DUs that are connected to a gNB-CU via individual F1 interfaces (not shown by FIG. 7). In these implementations, the gNB-DUs may include one or more remote radio heads or RFEMs, and the gNB-CU may be operated by a server that is located in the (R)AN 708 (not shown) or by a server pool in a similar manner as the CRAN/vBBUP. Additionally, or alternatively, one or more of the RAN node 714 or RAN node 716 may be next generation eNBs (ng-eNBs), which are RAN nodes that provide E-UTRA user plane and control plane protocol terminations toward the UE 722 and UE 720, and are connected to an SGC via an NG interface (discussed infra). In V2X scenarios one or more of the RAN node 714 or RAN node 716 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 714 and/or the RAN node 716 can terminate the air interface protocol and can be the first point of contact for the UE 722 and UE 720. In some embodiments, the RAN node 714 and/or the RAN node 716 can fulfill various logical functions for the (R)AN 708 including, but not limited to, radio network controller (RNC) functions such as radio bearer management, uplink and downlink dynamic radio resource management and data packet scheduling, and mobility management.

In embodiments, the UE 722 and UE 720 can be configured to communicate using OFDM communication signals with each other or with the RAN node 714 and/or the RAN node 716 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 714 and/or the RAN node 716 to the UE 722 and UE 720, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 722 and UE 720 and the RAN node 714 and/or the RAN node 716 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 722 and UE 720 and the RAN node 714 or RAN node 716 may operate using LAA, eLAA, and/or feLAA mechanisms. In these implementations, the UE 722 and UE 720 and the RAN node 714 or RAN node 716 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 722 and UE 720, RAN node 714 or RAN node 716, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 722, AP 712, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 722 to undergo a handover. In LAA, eLAA, and feLAA, some or all of the SCells may operate in the unlicensed spectrum (referred to as "LAA SCells"), and the LAA SCells are assisted by a PC ell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 722 and UE 720. The PDCCH carries information about the transport format and resource allocations related to the PDSCH channel, among other things. It may also inform the UE 722 and UE 720 about the transport format, resource allocation, and HARQ information related to the uplink shared channel. Typically, downlink scheduling (assigning control and shared channel resource blocks to the UE 720 within a cell) may be performed at any of the RAN node 714 or RAN node 716 based on channel quality information fed back from any of the UE 722 and UE 720. The downlink resource assignment information may be sent on the PDCCH used for (e.g., assigned to) each of the UE 722 and UE 720.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 714 or RAN node 716 may be configured to communicate with one another via interface 730. In embodiments where the system 700 is an LTE system (e.g., when CN 706 is an EPC), the interface 730 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 722 from an SeNB for user data; information of PDCP PDUs that were not delivered to a UE 722; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 700 is a 5G or NR system (e.g., when CN 706 is an 5GC), the interface 730 may be an Xn interface. The Xn interface is defined between two or more RAN nodes (e.g., two or more gNBs and the like) that connect to 5GC, between a RAN node 714 (e.g., a gNB) connecting to 5GC and an eNB, and/or between two eNBs connecting to 5GC (e.g., CN 706). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 722 in a connected mode (e.g., CM-CONNECTED) including functionality to manage the UE mobility for connected mode between one or more RAN node 714 or RAN node 716. The mobility support may include context transfer from an old (source) serving RAN node 714 to new (target) serving RAN node 716; and control of user plane tunnels between old (source) serving RAN node 714 to new (target) serving RAN node 716. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 708 is shown to be communicatively coupled to a core network-in this embodiment, CN 706. The CN 706 may comprise one or more network elements 732, which are configured to offer various data and telecommunications services to customers/subscribers (e.g., users of UE 722 and UE 720) who are connected to the CN 706 via the (R)AN 708. The components of the CN 706 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 706 may be referred to as a network slice, and a logical instantiation of a portion of the CN 706 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 718 may be an element offering applications that use IP bearer resources with the core network (e.g., UMTS PS domain, LTE PS data services, etc.). The application server 718 can also be configured to support one or more communication services (e.g., VoIP sessions, PTT sessions, group communication sessions, social networking services, etc.) for the UE 722 and UE 720 via the EPC. The application server 718 may communicate with the CN 706 through an IP communications interface 736.

In embodiments, the CN 706 may be an 5GC, and the (R)AN 116 may be connected with the CN 706 via an NG interface 734. In embodiments, the NG interface 734 may be split into two parts, an NG user plane (NG-U) interface 726, which carries traffic data between the RAN node 714 or RAN node 716 and a UPF, and the S1 control plane (NG-C) interface 728, which is a signaling interface between the RAN node 714 or RAN node 716 and AMFs.

In embodiments, the CN 706 may be a 5G CN, while in other embodiments, the CN 706 may be an EPC). Where CN 706 is an EPC, the (R)AN 116 may be connected with the CN 706 via an S1 interface 734. In embodiments, the S1 interface 734 may be split into two parts, an S1 user plane (S1-U) interface 726, which carries traffic data between the RAN node 714 or RAN node 716 and the S-GW, and the S1-MME interface 728, which is a signaling interface between the RAN node 714 or RAN node 716 and MMEs.

Figure 8:
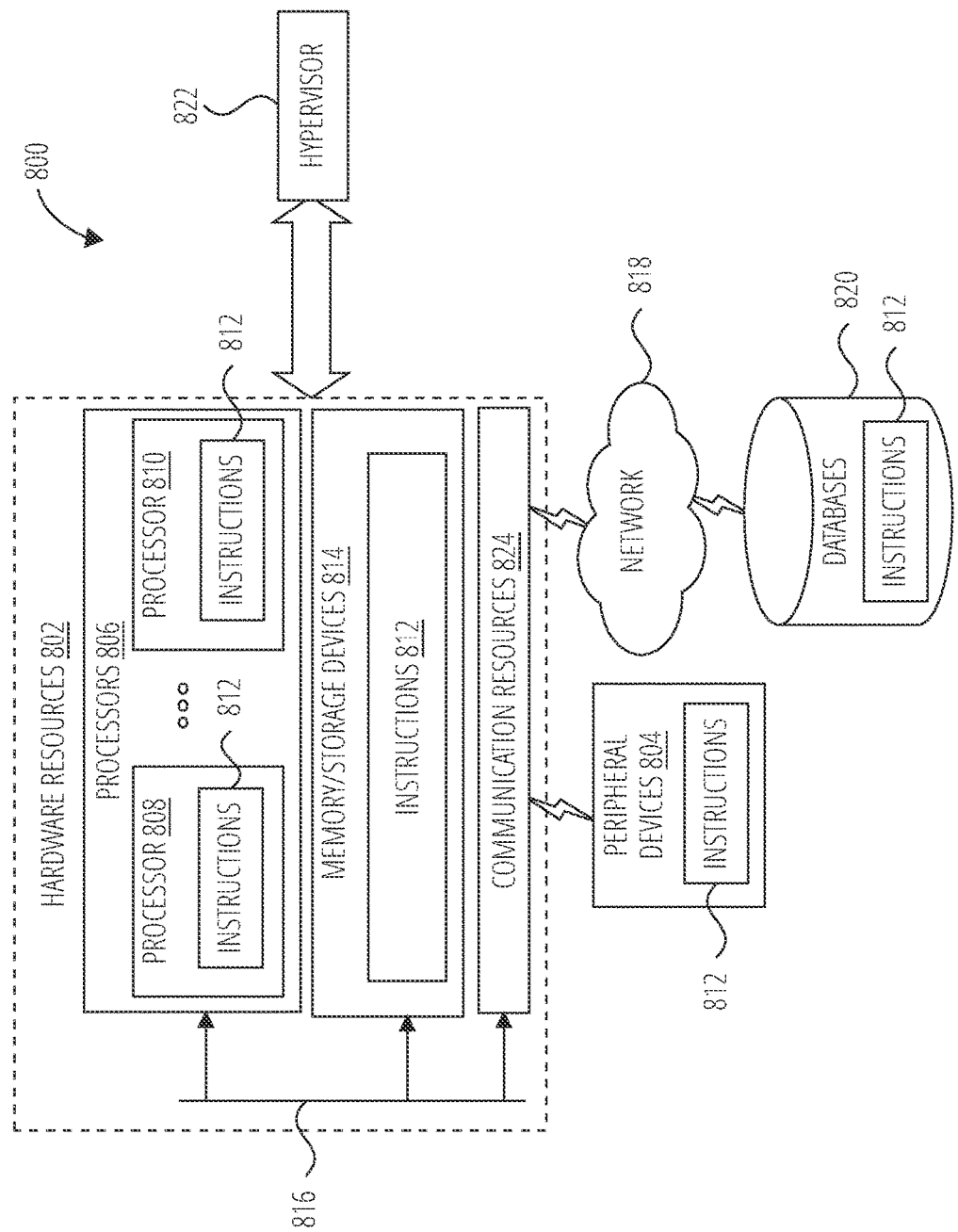
FIG. 8 illustrates components in accordance with some embodiments.

FIG. 8 is a block diagram illustrating components 800, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 802 including one or more processors 806 (or processor cores), one or more memory/storage devices 814, and one or more communication resources 824, each of which may be communicatively coupled via a bus 816. For embodiments where node virtualization (e.g., NFV) is utilized, a hypervisor 822 may be executed to provide an execution environment for one or more network slices/sub-slices to utilize the hardware resources 802.

The processors 806 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 808 and a processor 810.

The memory/storage devices 814 may include main memory, disk storage, or any suitable combination thereof. The memory/storage: devices 814 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 824 may include interconnection or network interface components or other suitable devices to communicate with one or more peripheral devices 804 or one or more databases 820 via a network 818. For example, the communication resources 824 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 812 may comprise software, a program, an application, an applet, an app, or other executable code for causing at least any of the processors 806 to perform any one or more of the methodologies discussed herein. The instructions 812 may reside, completely or partially, within at least one of the processors 806 (e.g., within the processor's cache memory), the memory/storage devices 814, or any suitable combination thereof. Furthermore, any portion of the instructions 812 may be transferred to the hardware resources 802 from any combination of the peripheral devices 804 or the databases 820. Accordingly, the memory of the processors 806, the memory/storage devices 814, the peripheral devices 804, and the databases 820 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method for extended clear channel assessment (eCCA) that may comprise determining that a communication channel is unoccupied for an initial duration, determining a number of communication slots of the communication channel to defer for transmission, counting one or more communication slots of the communication channel that are not in use, determining that the number of the counted one or more communication slots is not equal to the determined number of communication slots of the communication channel to defer, and transmitting one or more data units based on the determination that the number of the counted one or more communication slots is not equal to the determined number of communication slots of the communication channel to defer. The one or more data units may comprise a synchronization signal block (SSB), a configured random access channel (RACH) resource, a sounding reference signal (SRS) symbol, or only a channel state information reference signal (CSI-RS).

Example 2 may include the method of example 1, wherein the transmitting of the one or more data units may use short control signaling.

Example 3 may include the method of example 1, wherein the initial duration may be 8 microseconds (μs).

Example 4 may include the method of example 1, wherein the determining that the communication channel is unoccupied for the initial duration may comprise comparing a detected energy of the communication channel to a predetermined threshold.

Example 5 may include the method of example 1, wherein the counting of the one or more communication slots of the communication channel that are not in use may comprise comparing an energy of the slot to a predetermined threshold, wherein the slot is in use when the energy of the slot is at or above the predetermined threshold and the slot is not in use when the energy of the slot is below the predetermined threshold.

Example 6 may include the method of example 1, and may further comprise determining that the number of the counted one or more communication slots is equal to the determined number of communication slots of the communication channel to defer.

Example 7 may include the method of example 6, wherein the transmitting of the one or more data units may comprise transmitting on the communication channel for up to a maximum channel occupancy time (COT).

Example 8 may include the method of example 7, wherein the COT may be equal to 5 milliseconds (ms).

Example 9 may include the method of example 7, wherein the transmitting of the one or more data units may comprise transmitting an SSB.

Example 10 may include the method of example 7, wherein the transmitting of the one or more data units may comprise transmitting a CSI-RS.

Example 11 may include the method of example 7, wherein the transmitting of the one or more data units may comprise transmitting a configured random access channel (RACH) resource or sounding reference signal (SRS) symbol.

Example 12 may include the method of example 7, wherein the number of communication slots of the communication channel to defer for transmission is 3.

Example 13 is a method for extended clear channel assessment (eCCA) that may comprise determining that a communication channel is unoccupied for an initial duration, determining to defer transmission in the communication channel by 3 communication slots of the communication channel, counting one or more communication slots of the communication channel, determining that a number of counted communication slots is equal to 3; and transmitting one or more data units based on the determination that the number of counted communication slots is equal to 3. The one or more data units may comprise a synchronization signal block (SSB), a configured random access channel (RACH) resource, or a sounding reference signal (SRS) symbol.

Example 14 may include the method of example 13, wherein the transmitting of the one or more data units may be performed by a base station, and the one or more data units may comprise the SSB.

Example 15 may include the method of example 13, wherein the transmitting of the one or more data units may be performed by a user equipment, and the one or more data units may comprise the configured RACH resource or the SRS symbol.

Example 16 may include a non-transitory computer-readable storage medium including instructions that when executed by a processor, cause the processor to determine that a communication channel is unoccupied for an initial duration, determine a number of communication slots of the communication channel to defer for transmission, count one or more communication slots of the communication channel that are not in use, determine that the number of the counted one or more communication slots is not equal to the determined number of communication slots of the communication channel to defer, and transmit one or more data units based on the determination that the number of the counted one or more communication slots is not equal to the determined number of communication slots of the communication channel to defer. The one or more data units may comprise a synchronization signal block (SSB), a configured random access channel (RACH) resource, a sounding reference signal (SRS) symbol, or only a channel state information reference signal (CSI-RS).

Example 17 may include the non-transitory computer-readable storage medium of example 16, wherein the transmitting of the one or more data units may use short control signaling.

Example 18 may include the non-transitory computer-readable storage medium of example 16 and may include instructions that when executed by a processor further cause the processor to determine that the number of the counted one or more communication slots is equal to the determined number of communication slots of the communication channel to defer.

Example 19 may include the non-transitory computer-readable storage medium of example 18, wherein the transmitting of the one or more data units may comprise transmitting on the communication channel for up to a maximum channel occupancy time (COT).

Example 20 may include the non-transitory computer-readable storage medium of example 19, wherein the COT may be equal to 5 ms.

Example 21 may include an apparatus comprising means to perform one or more elements of a method described in or related to any of the above Examples, or any other method or process described herein.

Example 22 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 23 may include an apparatus comprising logic, modules, or circuitry to perform one or more elements of a method described in or related to any of the above Examples, or any other method or process described herein.

Example 24 may include a method, technique, or process as described in or related to any of the above Examples, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 26 may include a signal as described in or related to any of the above Examples, or portions or parts thereof.

Example 27 may include a datagram, packet, frame, segment, protocol data unit (PDU), or message as described in or related to any of the above Examples, or portions or parts thereof, or otherwise described in the present disclosure.

Example 28 may include a signal encoded with data as described in or related to any of the above Examples, or portions or parts thereof, or otherwise described in the present disclosure.

Example 29 may include a signal encoded with a datagram, packet, frame, segment, PDU, or message as described in or related to any of the above Examples, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 31 may include a computer program comprising instructions, wherein execution of the program by a processing element is to cause the processing element to carry out the method, techniques, or process as described in or related to any of the above Examples, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for extended clear channel assessment (eCCA), comprising:
    determining that a communication channel is unoccupied for an initial duration;
    determining a number of communication slots of the communication channel to defer for transmission;
    counting one or more communication slots of the communication channel that are not in use;
    comparing a number of the counted one or more communication slots to the determined number of communication slots of the communication channel to defer; and
    in response to determining that the number of the counted one or more communication slots is not equal to the determined number of communication slots of the communication channel to defer:
        transmitting one or more data units based on the determination that the number of the counted one or more communication slots is not equal to the determined number of communication slots of the communication channel to defer, the one or more data units comprising a synchronization signal block (SSB), a configured random access channel (RACH) resource, a sounding reference signal (SRS) symbol, or only a channel state information reference signal (CSI-RS).

2. The method of claim 1, wherein the transmitting of the one or more data units uses short control signaling.

3. The method of claim 1, wherein the initial duration is 8 microseconds (μs).

4. The method of claim 1, wherein the determining that the communication channel is unoccupied for the initial duration comprises comparing a detected energy of the communication channel to a predetermined threshold.

5. The method of claim 1, wherein the counting of the one or more communication slots of the communication channel that are not in use comprises comparing an energy of a slot to a predetermined threshold, wherein the slot is in use when the energy of the slot is at or above the predetermined threshold and the slot is not in use when the energy of the slot is below the predetermined threshold.

6. The method of claim 1, further comprising in response to determining that the number of the counted one or more communication slots is equal to the determined number of communication slots of the communication channel to defer:
    transmitting of the one or more data units comprises transmitting on the communication channel for up to a maximum channel occupancy time (COT).

7. The method of claim 6, wherein the COT is equal to 5 milliseconds (ms).

8. The method of claim 6, wherein the transmitting of the one or more data units comprises transmitting an SSB.

9. The method of claim 6, wherein the transmitting of the one or more data units comprises transmitting a CSI-RS.

10. The method of claim 6, wherein the transmitting of the one or more data units comprises transmitting a configured random access channel (RACH) resource or sounding reference signal (SRS) symbol.

11. The method of claim 6, wherein the number of communication slots of the communication channel to defer for transmission is 3.

12. A non-transitory computer-readable storage medium including instructions that when executed by a processor, cause the processor to:
    determine that a communication channel is unoccupied for an initial duration;
    determine a number of communication slots of the communication channel to defer for transmission;
    count one or more communication slots of the communication channel that are not in use;
    compare a number of the counted one or more communication slots to the determined number of communication slots of the communication channel to defer; and
    in response to a determination that the number of the counted one or more communication slots is not equal to the determined number of communication slots of the communication channel to defer:
        transmit one or more data units based on the determination that the number of the counted one or more communication slots is not equal to the determined number of communication slots of the communication channel to defer, the one or more data units comprising a synchronization signal block (SSB), a configured random access channel (RACH) resource, a sounding reference signal (SRS) symbol, or only a channel state information reference signal (CSI-RS).

13. The non-transitory computer-readable storage medium of claim 12, wherein the transmitting of the one or more data units uses short control signaling.

14. The non-transitory computer-readable storage medium of claim 12, including instructions that when executed by a processor further cause the processor to:
    in response to a determination that the number of the counted one or more communication slots is equal to the determined number of communication slots of the communication channel to defer: transmitting of the one or more data units comprises transmitting on the communication channel for up to a maximum channel occupancy time (COT).

15. The non-transitory computer-readable storage medium of claim 14, wherein the COT is equal to 5 milliseconds (ms).

16. An apparatus comprising:
one or more processors; and
one or more computer-readable media comprising instructions that, when executed by the one or more processors, cause the one or more processors to perform extended clear channel assessment (eCCA), the one or more processors configured to:
  determine that a communication channel is unoccupied for an initial duration;
  determine a number of communication slots of the communication channel to defer for transmission;
  count one or more communication slots of the communication channel that are not in use;
  determine that a number of the counted one or more communication slots is not equal to the determined number of communication slots of the communication channel to defer; and
  transmit one or more data units based on the determination that the number of the counted one or more communication slots is not equal to the determined number of communication slots of the communication channel to defer, the one or more data units comprising a synchronization signal block (SSB), a configured random access channel (RACH) resource, a sounding reference signal (SRS) symbol, or only a channel state information reference signal (CSI-RS).

17. The apparatus of claim 16, wherein the transmitting of the one or more data units uses short control signaling.

18. The apparatus of claim 16, wherein the initial duration is 8 microseconds (μs).

* * * * *